(12) United States Patent
Tomohiko

(10) Patent No.: US 11,279,433 B2
(45) Date of Patent: Mar. 22, 2022

(54) VEHICULAR FRAME'S COUPLER STRUCTURE

(71) Applicant: Alumis Co. Ltd., Tosu (JP)

(72) Inventor: Yoda Tomohiko, Tosu (JP)

(73) Assignee: Alumis Co. Ltd., Tosu (JP)

(*) Notice: Subject to any disclaimer, the term of this patent is extended or adjusted under 35 U.S.C. 154(b) by 97 days.

(21) Appl. No.: 16/577,302

(22) Filed: Sep. 20, 2019

(65) Prior Publication Data
US 2020/0102042 A1    Apr. 2, 2020

(30) Foreign Application Priority Data

Oct. 1, 2018  (JP) .............................. JP2018-186371

(51) Int. Cl.
  *B62K 15/00* (2006.01)
  *B62K 3/02* (2006.01)
(52) U.S. Cl.
  CPC ................ *B62K 15/00* (2013.01); *B62K 3/02* (2013.01); *B62K 2015/001* (2013.01)
(58) Field of Classification Search
  CPC ... B62K 2015/001; B62K 19/24; B62K 15/00
  USPC ........................................................ 280/287
  See application file for complete search history.

(56) References Cited

U.S. PATENT DOCUMENTS

| | | | | |
|---|---|---|---|---|
| 617,535 | A * | 1/1899 | Martin ................. | B62K 15/006 280/287 |
| 3,304,099 | A * | 2/1967 | Jankowski ............. | B62K 15/00 280/287 |
| 5,069,468 | A * | 12/1991 | Tsai ..................... | B62K 15/008 280/278 |
| 7,637,522 | B2 * | 12/2009 | Lin ........................ | B62K 3/06 280/281.1 |
| 7,832,766 | B2 * | 11/2010 | Kudo ..................... | B62K 19/24 280/785 |
| 9,321,500 | B2 * | 4/2016 | Wang .................. | B62K 15/006 |

FOREIGN PATENT DOCUMENTS

JP    2010274707 A    12/2010

* cited by examiner

*Primary Examiner* — Kevin Hurley
*Assistant Examiner* — Hosam Shabara
(74) *Attorney, Agent, or Firm* — Argus Intellectual Enterprise; Jordan Sworen; Daniel Enea

(57) ABSTRACT

A vehicle frame's coupler structure that connects separable frames for easy assembly and disassembly, at a low cost. Further, the couple structure can provide a vehicle that is easy to operate, without affecting the user when in use. The vehicle frame's coupler structure includes combining a Front-side Coupler Inner Face (8) with Rear-side Coupler Inner Face (9), and after making sure all components of (8) and (9) are in place (no protruding edges, etc.), and using Bolt (15) to fasten Part (6) with Part (7). The end result is the coupler system of the vehicle.

6 Claims, 5 Drawing Sheets

VEHICULAR FRAME'S COUPLER STRUCTURE

CROSS REFERENCE TO RELATED APPLICATION

This application claims the benefit of JP utility patent application No. 2018-186371 filed on Oct. 1, 2018, the above identified patent application is herein incorporated by reference in its entirety.

BACKGROUND OF THE INVENTION

The present invention uses a special interlocking mechanism, which allows a bicycle to be assembled and disassembled into different parts.

Due to increased use of bicycles and similar vehicles, there is an increased demand for manufactures to ship these bicycles across the world. However, the frame of a bicycle can be large and difficult to economically ship. Therefore, there is a need to provide frames capable of disassembling into multiple parts in order to save space for storage or during shipment. When the vehicle is not in use, various parts could be disassembled, neatly packaged in the original box for easy storage or shipping. Whether it be showcasing in a store or for everyday use, the present invention makes it easy to assembly multiple parts into one vehicle.

The bicycle frame is designed to receive a rider's weight and any horizontal/vertical impacts into consideration. Since there are two separate parts, the design for the coupler component is required to be strong enough to withstand external impacts.

The previously aforementioned design requirement can also be applied to existing folding bikes. In one existing design, found in JP published patent application no. JP2010274707A, the folding bike's Frame Pipe 3A & 3B, Hinge Axis 4 as the center, and using Hinges 6 and 7 to freely open and close the folding latch. On one side, Hinge 6 is used to move Rotation Axis 11. When Rotation Axial 11 is engaged, which in turn rotates Hinge Lever 12, Hinge 6 & 7 and Stopper 21 disengages, which also reengages the Folding part (17) of the bicycle. However, one of the problems with the design of the frame is the high production cost that comes with the complexity of the coupler component. In addition, because the coupler is perpendicular and on the same plane as the lower frame pipe, there may be contact between these parts and the rider's legs when riding.

In view of the above concerns, it is desirable to provide a device having multiple frames parts that can be manufactured at a low cost, as well also preventing any unwanted contact between the bicycle and the rider.

In light of the devices disclosed in the known art, it is submitted that the present invention substantially diverges in design elements and methods from the known art and consequently it is clear that there is a need in the art for an improvement for a vehicular frame's coupler structure. In this regard the instant invention substantially fulfills these needs.

SUMMARY OF THE INVENTION

In view of the foregoing disadvantages inherent in the known types of vehicular frame's coupler structure now present in the known art, the present invention provides a new vehicular frame's coupler structure wherein the same can be utilized for assembling and disassembling a vehicle frame into distinct parts.

It is an objective of the present invention to provide a vehicle frame having multiple frame components that connect to one another to form one assembled vehicle, such as a bicycle. By design, two inner faces of the connection parts (front and rear, respectively) have an inclined angle that allows the coupler to be well-fitted together. By inserting and fastening the coupler bolts into the left and right sides, the two frames are securely connected. The two inclined inner surfaces are designed to interact with each other to prevent slippage and strengthen the overall cohesiveness of the coupler. By having this type of special design, the coupler part is strengthened to prevent separation during use.

It is another objective of the present invention to provide a vehicle frame having two frames securely fastened together, and even though this vehicle was constructed from multiple parts, the vehicle is able to stay stable while being operated on. With the simplicity of the coupler system, it is possible to reduce the manufacturing cost. Furthermore, because the inclined inner surfaces of the front and rear couplers are hidden from the user, they do not interfere with the rider's body, making the riding experience safe and enjoyable.

It is another objective of the present invention to provide a vehicle frame's coupler structure having a jagged part in the middle of the coupler that prevents the coupler from separating. Furthermore, there are pin holes in the inner surface of the coupler that further strengths the coupler from separation. The aforementioned jagged part and the pin holes not only prevents relative displacement, but also resists any relative rotation that may occur during use.

It is another objective of the present invention to provide a vehicle frame's coupler structure configured to resist corkscrew motion (clockwise or counterclockwise movement) during use.

With the aforementioned objectives, the connection part between the two frames does not only resist relative rotation, but also increases the overall strength of the bicycle's frame system.

In some embodiments of the vehicle frame's coupler structure, the coupler is configured to accommodate several more bolts that are lined up in the same plane, next to each other. Simultaneously, with several bolts, it is possible to further increase the overall strength and hardness of the coupler frame.

With the aforementioned method of combining several frames into one vehicle, it is possible to use this design for other forms of vehicles, such as bicycles, electric bicycles, electric bikes, electric 3-wheeled wagons, etc.

This invention is the method in which multiple frames can be assembled into a final product. Because of the unique shapes and structure of the coupler, as well as the way the front and back frame fits together, the vehicle is not prone to sudden disassembly during use. Furthermore, the structure is designed to lower manufacture cost. After assembly of the bicycle, because the inner face of the coupler system is hidden from the rider, the user's clothes or body will not catch on or interact with the bicycle in any way as to interfere with the riding experience.

It is therefore an object of the present invention to provide a new and improved vehicle frame's coupler structure that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
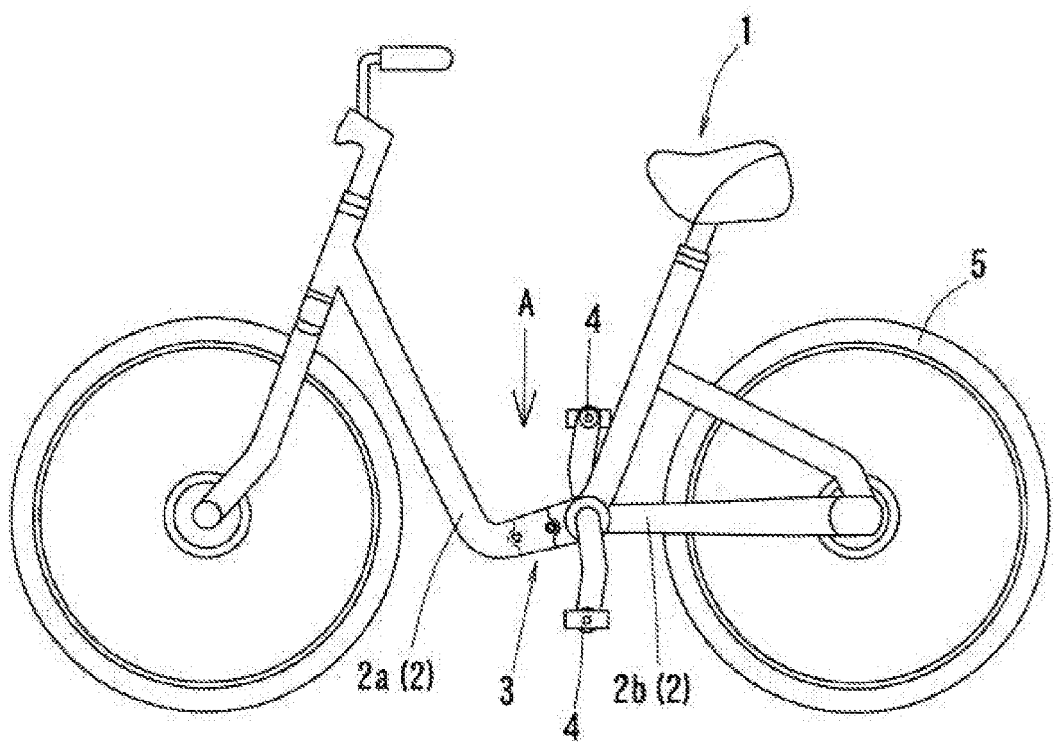
FIG. 1 shows a side view of an embodiment of the vehicle frame's coupler structure, wherein the vehicle is a bicycle.

Reference is made herein to the attached drawings. Like reference numerals are used throughout the drawings to depict like or similar elements of the carrying case. For the purposes of presenting a brief and clear description of the present invention, the preferred embodiment will be discussed as used for a collapsed folding chair therein. The figures are intended for representative purposes only and should not be considered to be limiting in any respect.

Figure 2:
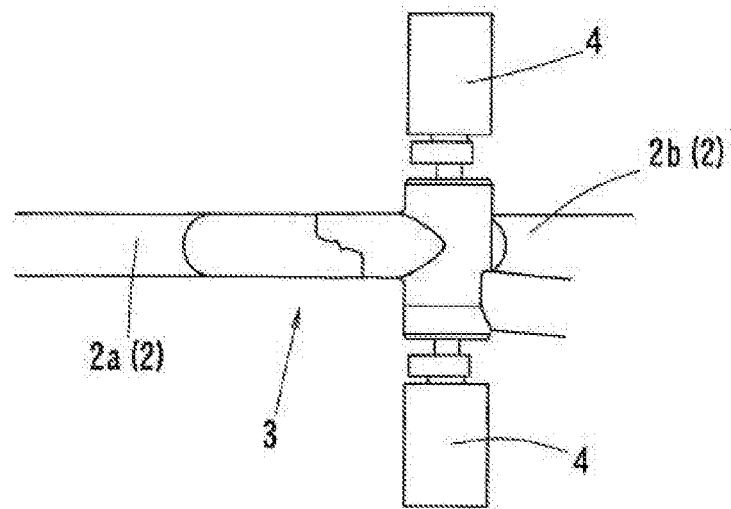
FIG. 2 shows a close-up view (as shown from 'A' referenced in FIG. 1) of an embodiment of the vehicle frame's coupler structure.

Referring now to FIGS. 1 and 2, there is shown a side view of an embodiment of the vehicle frame's coupler structure, wherein the vehicle is a bicycle and a close-up view of an embodiment of the vehicle frame's coupler structure, as seen from direction A of FIG. 1, respectively. In the illustrated embodiment, the vehicle is a bicycle having a frame 2 that is configured to be separated into two distinct parts, a front frame 2a and a back frame 2b. The vehicle frame's coupler structure 3 connects the front frame 2a to the back frame 2b of the bicycle. In the illustrated embodiment, the bicycle is different from a conventional bicycle in that instead of pedal-powered chain-propelled method, this bicycle uses drive-shaft technology to turn the gear in the bottom bracket, which moves the propeller-shaft gear located in Part 2b. With this, power is projected from the pedals 4 to the rear wheel 5. In the shown embodiment, the frame 2, which includes the front frame 2a and back frame 2b, and the vehicle frame's coupler structure 3 are made with aluminum alloy. In the illustrated embodiment, the bicycle is configured to be solely powered by the rider. However, in alternate embodiments, the vehicle frame's coupler structure 3 is configured to apply to electric bicycles, other electric vehicles, and other non-electric vehicles.

Figure 3:
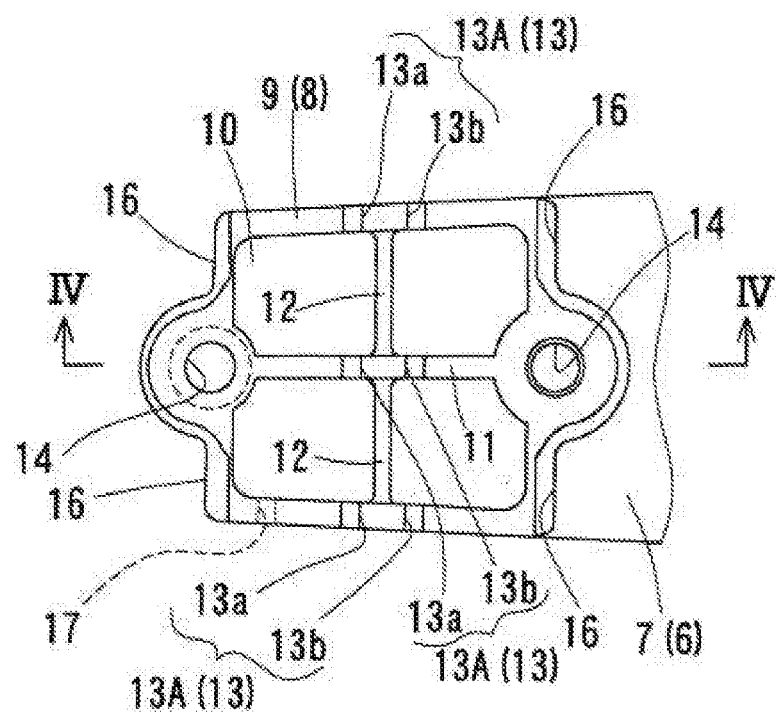
FIG. 3 shows a side view of an inner face of an embodiment of the vehicle frame's coupler structure from the bicycle design in FIG. 1.
Figure 4:
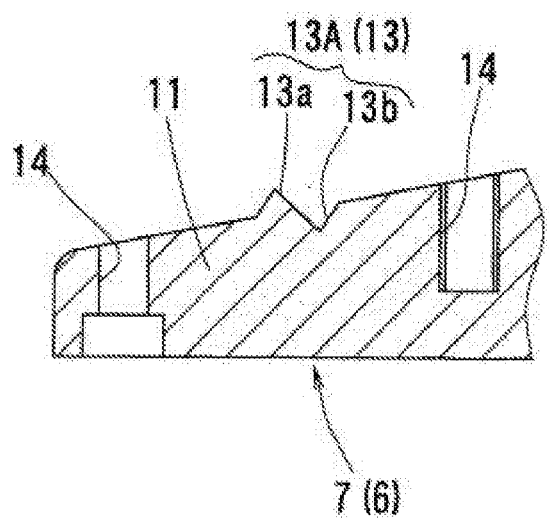
FIG. 4 shows a cross-sectional view of an inner face of an embodiment of the vehicle frame's coupler structure taken along line IV-IV of FIG. 3.

Referring now to FIGS. 3 and 4, there is shown a side view of an inner face of an embodiment of the vehicle frame's coupler structure from the bicycle design in FIG. 1 and a cross-sectional view of an inner face of an embodiment of the vehicle frame's coupler structure taken along line Iv-Iv of FIG. 3, respectively. In the illustrated embodiment, the vehicle frame's coupler structure 3 allows multiple parts/frames to be connected into one part/frame, which in this embodiment, are the front frame 2a and rear frame 2b.

In the vehicle frame's coupler structure 3, the front frame 2a forms an outer piece, which is a front-side coupler piece 6, and the rear frame 2b also forms an outer piece, which is a rear-side coupler piece 7. The front-side coupler piece 6 has an interior face that is normal to the coupler's inner inclined surface, which is a front-side coupler inner face 8. Similarly, the rear-side coupler piece 7 also has a component that is normal to its coupler's inner inclined surface, which is a rear-side coupler inner face 9. With this method of depicting surface normal, the front-side coupler piece and the rear-side coupler piece 7 are also depicted in the same way as a thin stripe in FIG. 4.

The front-side coupler inner face 8 and the rear-side coupler inner face 9 each part has a coupler concavity 10. The coupler concavities 10 runs normal to the inner inclined surfaces of the front-side coupler inner face 8 and the rear-side coupler inner face 9, forming a border with a central rib 11. The other face of the coupler concavities 10 meet with a side rib 12. With the coupler concavities 10, the central rib 11, and the side rib 12, the total weight reduction of the vehicle frame's coupler structure 3 is achieved without compromising the structural integrity and strength of the front-side coupler piece 6 and the rear-side coupler piece 7.

The front-side coupler inner face 8 and the rear-side coupler inner face 9, which has a central rib 11 and a jagged component 13 combined to form the central coupler, which is in turn directly connected to the front-side coupler piece 6 and the rear-side coupler piece 7.

With regards to the jagged component 13 in the middle of the coupler, 13a is the crest, while 13b is the trough of the jagged component 13. When combined, the crest 13a of the front-side coupler inner face 8 will fit together with the trough 13b of the rear-side coupler inner face 9, and the trough 13b of the front-side coupler inner face 8 will fit with the crest 13a of the rear-side coupler inner face 9. The jagged component 13 ensures that the front-side coupler piece 6 and the rear-side coupler piece 7 will not separate during use.

The front-side coupler piece 6 and the rear-side coupler piece 7, which makes up the coupler component, each has bolt holes 14. By inserting a steel bolt 15 into each of the open bolt holes located on the front-side coupler piece 6 and the rear-side coupler piece 7. The screw thread of the bolts are designed to fasten to the end of the threaded hole, which the screw heads are designed to not protrude from the surface of the front-side coupler piece 6 and the rear-side coupler piece 7. This means that during riding, the user's clothing will not catch on to bolt 15.

By using two bolts to secure the front frame 2a with the back frame 2b, with one bolt on each side, the front frame and back frame are strengthened against relative rotation (i.e. the front twisting clockwise, while the back twists counterclockwise, and vice versa). This increases the overall strength of the combined frame.

Figure 5:
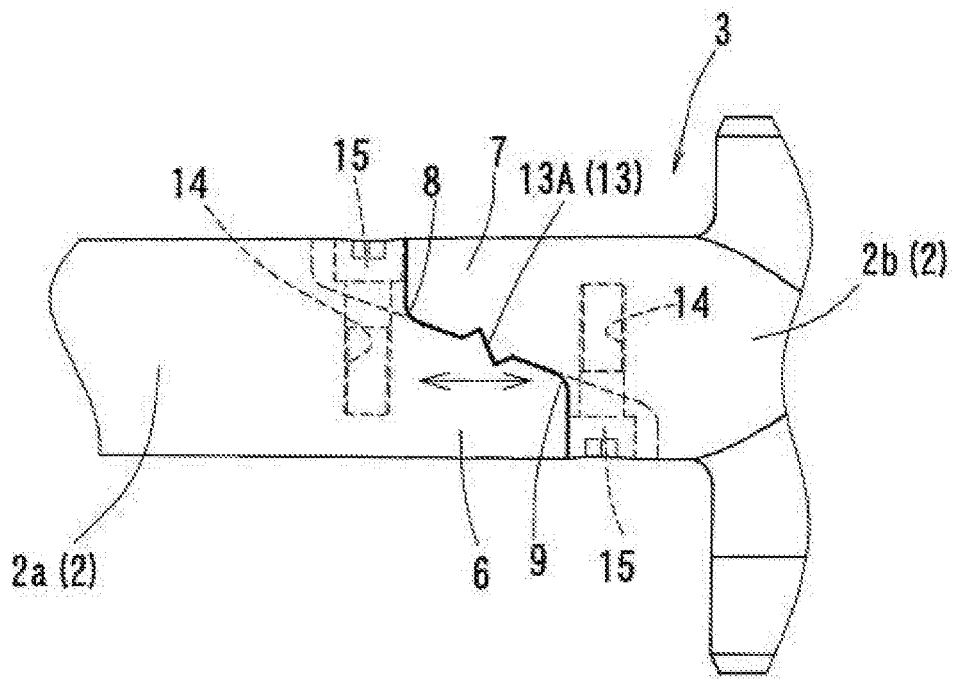
FIG. 5 shows a plan view of a coupler connected of an embodiment of the vehicle frame's coupler structure.

Referring now to FIG. 5, there is shown a plan view of a coupler connected of an embodiment of the vehicle frame's coupler structure. As illustrated in FIG. 5, when the front-side coupler inner face 8 and the rear-side coupler inner face 9 are put together and secured with bolt 15, the overall strength of the coupler system increases, with the help of the jagged component part 13A. Both the relative displacement (movement in the forward/back motion) and relative rotation (twisting in the clockwise and counterclockwise direction) are prevented.

Figure 6:
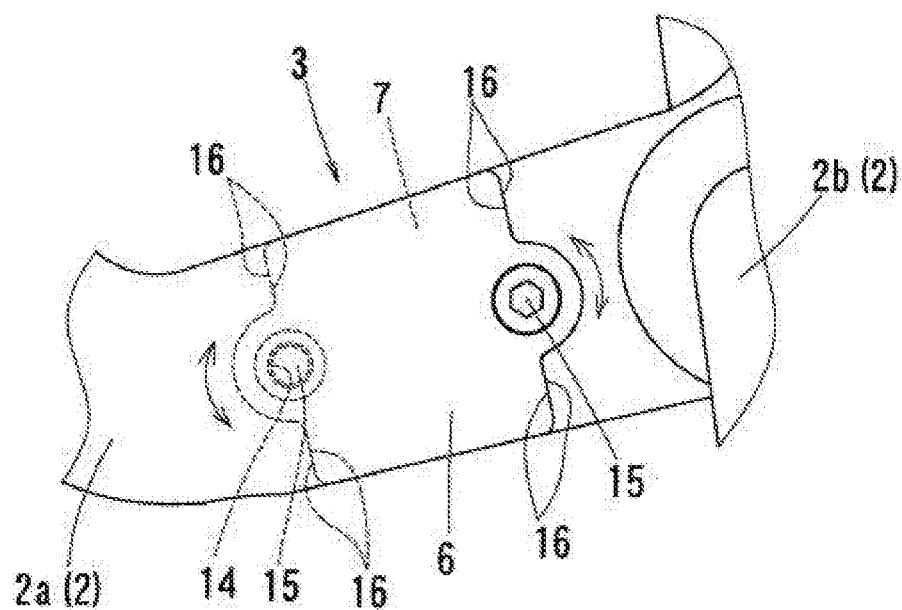
FIG. 6 shows a plan view of a coupler connected of an embodiment of the vehicle frame's coupler structure.

Referring now to FIG. 6, there is shown a plan view of a coupler connected of an embodiment of the vehicle frame's coupler structure. As illustrated in FIG. 5, the coupler structure 3 is tightened by fastening both bolts 15 into holes 14. With the design of the shape formed by a contact surface 16 in shown in FIG. 6, they prevent the coupler structure 3 from rotative rotation (motion in the direction of the arrow, depicted in FIG. 6).

During rainy days, water might seep and accumulate in the coupler concavity 10. To prevent this, a drain hole 17 was designed in the front-side coupler piece 6 and the rear-side coupler piece 7, to drain any water that enters the coupler's interiors. This greatly reduces the rate of rust in the coupler's interior, which in turn increases the overall strengths and rust-resistance of the coupler system.

Figure 7:
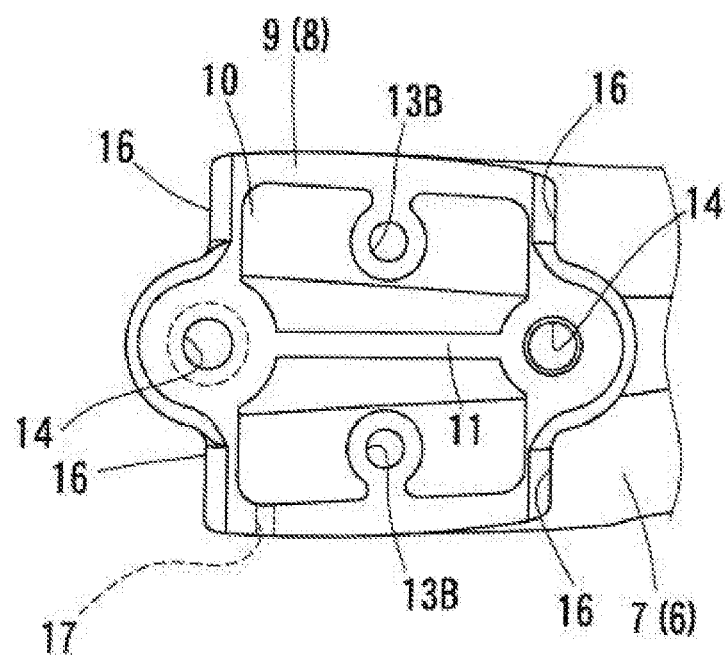
FIG. 7 shows a side view an inner face of an alternate embodiment of the vehicle frame's coupler structure.
Figure 8:
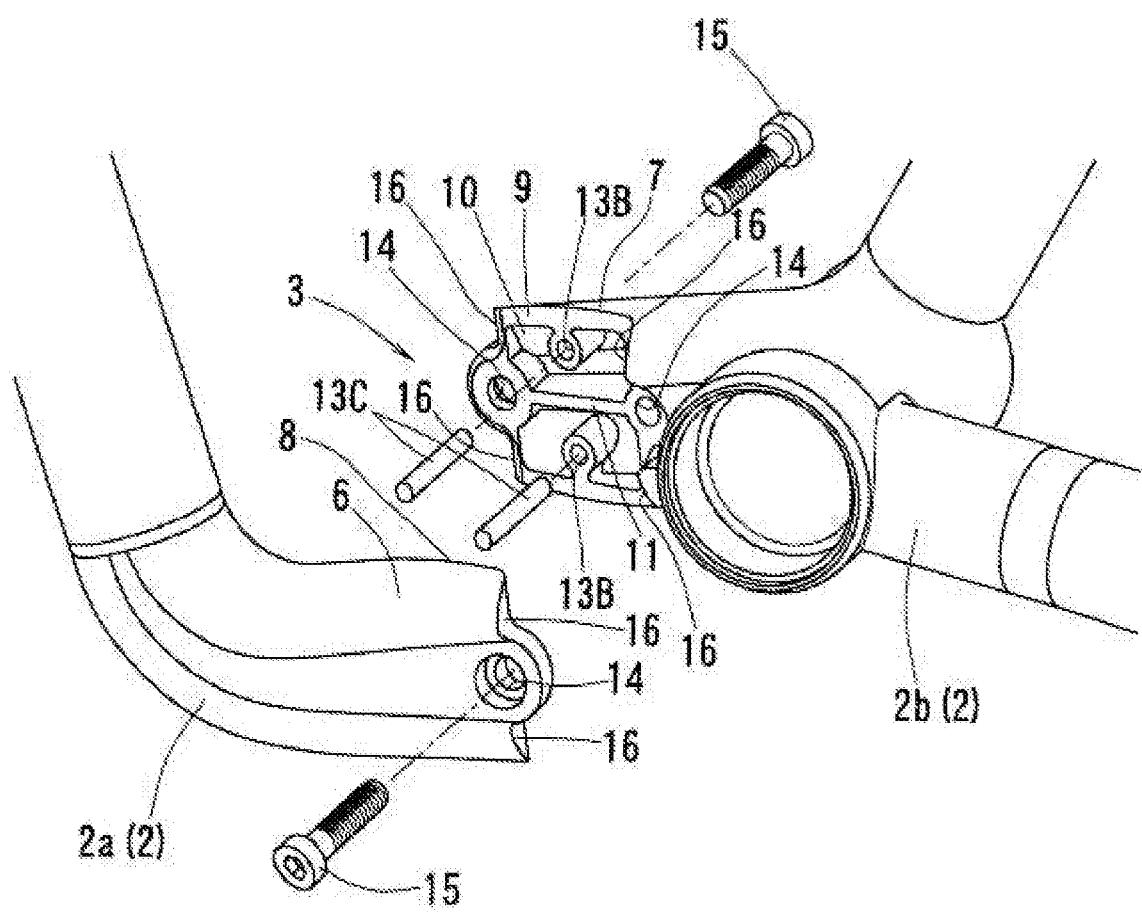
FIG. 8 shows an exploded view of an alternate embodiment of the vehicle frame's coupler structure.

Referring now to FIGS. 7 and 8, there is shown a side view an inner face of an alternate embodiment of the vehicle frame's coupler structure and an exploded view of an alternate embodiment of the vehicle frame's coupler structure, respectively. The structural component of this version is quite different, such as jagged component 13 and side rib 12, etc. For simplicity purposes, for the following paragraphs, any explanations on previously described parts or similar components will be omitted.

In this second version of design, in the inner surface of the coupler, there are 2 pin holes 13B on each inner face, with pins 13C. These two pin holes, together with the original holes 14 (completed with Bolt 15), forms two straight lines that are perpendicular to each other.

In use, pins 13C are used to be inserted into pin holes 13B (FIG. 8). Initially, the two pins are inserted into either the pin holes on the front-side coupler piece 6 and the rear-side coupler piece 7. With the two pins secured in the pin holes 13B of one side, the other Part's pin holes 13B are pushed into these two pins to combine these two parts. This helps secure the coupler from separation.

Initially, pins 13C are used to fixate the front-side coupler piece 6 and the rear-side coupler piece 7 together, then screwing in bolt 15 to secure the coupler 3. This makes the task much easier, as the frame is fixated, therefore preventing it from moving while the bolts are being secured. The position of the pin holes 13B and the coupler bolt hole 14 forms two perpendicular straight lines, which when both pins and bolts are securely tightened, ensures that there are no gaps between the front-side coupler piece 6 and the rear-side coupler piece 7.

From FIG. 8, the two pins 13C are independent components/parts. However, it is also possible to pre-fabricate either the front-side coupler piece 6 and the rear-side coupler piece 7 with the two pins. That way, the factory assembler is saved the work of inserting pins 13C into pin holes 13B, reducing manufacture and labor cost.

In the aforementioned articles about the coupler system of Bicycle 1 (FIG. 1), lowered manufacturing cost was achieved. Furthermore, the coupler system has the advantage of not interfering with or catching onto the rider's clothes during riding. With these two problems solved, it is possible to change other parameters of the bicycle, including the shape, quantity of parts, or materials used to better fit the manufacturer's needs.

In the aforementioned design, the front-side coupler piece 6 and the rear-side coupler piece 7 are located on the left and right side of the coupler structure 3. However, the design also allows the front-side coupler piece 6 and the rear-side coupler piece 7 to be located on the top and underside of the coupler structure 3. Furthermore, this particular design allows disassembly not just at Part 3, but also at other parts of the bicycle as well. Lastly, the coupler design is not limited to just bicycles, but also electric bicycles, electric bikes, electric 3-wheel vehicles, etc.

The following is a list of the Parts as shown in the Figures and referenced throughout:
1 Vehicle (bicycle)
2 Separable Frames
2a Front Frame
2b Back Frame
3 Coupler/Connector
4 Pedal
5 Rear Wheel
6 Front-side Coupler Piece
7 Rear-side Coupler Piece
8 Front-side Coupler Inner Face
9 Rear-side Coupler Inner Face
10 Coupler Concavity
11 Central Rib
12 Side Rib
13A Jagged Component
13a Jagged Component (Crest)
13b Jagged Component (Trough)
13B Pin Hole
13C Pin
14 Coupler Bolt Hole
15 Coupler Bolt
16 Contact Surface
17 Drain Hole It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular frame's coupler structure, comprising:
 a bicycle (1) configured to separate into multiple frames (2), wherein the multiple frames (2) are configured to reassemble into the bicycle;
 wherein each of the multiple frames (2) comprise a coupler system having a front inner face (8), a rear inner face (9), and a jagged component (13);
 wherein the jagged component (13) is located in the middle of the coupler system;
 wherein the bicycle is assembled by joining the front inner face (8) and the rear inner face (9) together and adjusting the coupler system until the jagged component (13) fits together, wherein the bolts (15) are inserted through corresponding bolt holes located on the surfaces of a front-side coupler piece (6) and a rear-side coupler piece (7);

wherein the jagged component (13) is configured to prevent rotation between the coupler system in relation to each frame of the multiple frames (2).

2. The vehicular frame's coupler structure of claim 1, wherein the bolts (15) used to secure the front-side coupler piece (6) and the rear-side coupler piece (7), along with a shape of a contact surface (16) formed between the front-side coupler piece (6) and the rear-side coupler piece (7), prevent against relative rotation of the vehicular frame's coupler structure.

3. The vehicular frame's coupler structure of claim 2, wherein the the bolts (15) comprise multiple bolts aligned linearly on a same plane.

4. A vehicular frame's coupler structure, comprising:

a bicycle (1) is configured to separate into multiple frames (2), wherein the multiple frames (2) are configured to reassemble into the bicycle;

wherein each of the multiple frames (2) comprise a coupler system having a front inner face (8), a rear inner face (9), and a jagged component (13);

wherein the jagged component (13) comprises pins (13C) and pin holes (13B) located in the inner faces of a front-side coupler piece (6) and a rear-side coupler piece (7);

wherein the bicycle is assembled by joining the front inner face (8) and the rear inner face (9) together and adjusting the coupler system until the jagged component (13) fits together, wherein the bolts (15) are inserted through corresponding bolt holes located on the surfaces of a front-side coupler piece (6) and a rear-side coupler piece (7);

wherein the jagged component (13) is configured to prevent rotation between the coupler system in relation to each frame of the multiple frames (2).

5. The vehicular frame's coupler structure of claim 4, wherein the bolts (15) used to secure the front-side coupler piece (6) and the rear-side coupler piece (7), along with a shape of a contact surface (16) formed between the front-side coupler piece (6) and the rear-side coupler piece (7), prevents against relative rotation of the vehicular frame's coupler structure.

6. The vehicular frame's coupler structure of claim 5, wherein the bolts (15) comprise multiple bolts aligned linearly on a same plane.

* * * * *